US012771563B2

(12) United States Patent
Cai et al.

(10) Patent No.: US 12,771,563 B2
(45) Date of Patent: Oct. 20, 2026

(54) PROOF-OF-WORK OPERATION METHOD, PROOF-OF-WORK CHIP, AND UPPER COMPUTER

(71) Applicant: SUNLUNE (SINGAPORE) PTE. LTD., Beijing (CN)

(72) Inventors: Kai Cai, Beijing (CN); Fuquan Wang, Beijing (CN); Ming Liu, Beijing (CN)

(73) Assignee: SUNLUNE (SINGAPORE) PTE. LTD., Beijing (CN)

( * ) Notice: Subject to any disclaimer, the term of this patent is extended or adjusted under 35 U.S.C. 154(b) by 413 days.

(21) Appl. No.: 18/264,445

(22) PCT Filed: Dec. 26, 2022

(86) PCT No.: PCT/CN2022/142072
§ 371 (c)(1),
(2) Date: Aug. 7, 2023

(87) PCT Pub. No.: WO2023/125448
PCT Pub. Date: Jun. 7, 2023

(65) Prior Publication Data

US 2024/0106668 A1 Mar. 28, 2024

(30) Foreign Application Priority Data

Dec. 30, 2021 (CN) ......................... 202111637854.7

(51) Int. Cl.
*H04L 9/00* (2022.01)
*G06F 21/78* (2013.01)

(52) U.S. Cl.
CPC ................ *H04L 9/50* (2022.05); *G06F 21/78* (2013.01)

(58) Field of Classification Search
CPC ......... H04L 9/50; G06F 21/78; G06F 15/7839
See application file for complete search history.

(56) References Cited

U.S. PATENT DOCUMENTS 9,015,557 B2 * 4/2015 Sarcone .................. H04L 1/004 714/751
2018/0107506 A1 * 4/2018 Suzuki .................. G06F 9/5027
(Continued)

FOREIGN PATENT DOCUMENTS

CN 108491269 A 9/2018
CN 108536642 A * 9/2018 ............. G06F 15/17
(Continued)

OTHER PUBLICATIONS

First Office Action for Chinese Application No. 202111637854.7, dated Feb. 11, 2022, 20 Pages (including English translation).
(Continued)

*Primary Examiner* — Sm A Rahman
(74) *Attorney, Agent, or Firm* — BROOKS KUSHMAN P.C.

(57) ABSTRACT

A proof-of-work operation method, a proof-of-work chip, and an upper computer. The proof-of-work chip comprises: a central control unit, which is configured to receive DAG data sent by an upper computer, an external DAG processing unit, which is configured to store the DAG data in a storage unit; the storage unit, which is configured to store the DAG data; and a calculation unit, which is configured to perform a proof-of-work operation according to the stored DAG data.

8 Claims, 7 Drawing Sheets

(56) References Cited

U.S. PATENT DOCUMENTS

| | | | | |
|---|---|---|---|---|
| 2018/0365180 | A1 * | 12/2018 | Craddock | G06F 12/1009 |
| 2020/0143372 | A1 | 5/2020 | Liu et al. | |

FOREIGN PATENT DOCUMENTS

| | | | | | |
|---|---|---|---|---|---|
| CN | 108777612 | A | | 11/2018 | |
| CN | 109564562 | A | | 4/2019 | |
| CN | 109886681 | A | | 6/2019 | |
| CN | 110084596 | A | | 8/2019 | |
| CN | 108777612 | B | | 3/2020 | |
| CN | 111429122 | A | | 7/2020 | |
| CN | 113114790 | A | | 7/2021 | |
| CN | 113282802 | A | | 8/2021 | |
| CN | 113485949 | A | * | 10/2021 | G06F 12/0877 |
| CN | 114003552 | A | | 2/2022 | |
| JP | 2001350714 | A | | 12/2001 | |
| WO | 2020165256 | A1 | | 8/2020 | |

OTHER PUBLICATIONS

International Search Report for Application No. PCT/CN2022/142072, dated Mar. 1, 2023, 4 Pages (including English translation).

Notification to Grant an Invention Patent for Chinese Application No. 202111637854.7, dated Mar. 4, 2022, 8 Pages (including English translation).

Li, Fan, "Research on Internet of Things Access Control Technology Based on Blockchain," Dissertation submitted to Zhejiang Gongshang University for Master's Degree of Engineering, Jan. 2020, Zhejiang Gongshang University, P. R. China, 65 Pages (including English abstract).

Zhou, Tong, "Research and Application of Tokenization Method of Trusted Data Based on Blockchain Technology," Dissertation submitted to University of Science and Technology of China for Doctor's Degree, Apr. 2019, University of Science and Technology of China, P.R. China, 136 Pages (including English abstract).

* cited by examiner

PROOF-OF-WORK OPERATION METHOD, PROOF-OF-WORK CHIP, AND UPPER COMPUTER

CROSS-REFERENCE TO RELATED APPLICATIONS

This application is the U.S. national phase of PCT Application No. PCT/CN2022/142072 filed on Dec. 26, 2022, which claims priority to Chinese Patent Application No. 202111637854.7 filed on Dec. 30, 2021, which are hereby incorporated herein by reference in their entireties.

TECHNICAL FIELD

Embodiments of the present disclosure relate to but are not limited to the technical field of computer application, especially to a method for operation on a proof of work, a chip of proof of work, and an upper computer.

BACKGROUND

Direct Acyclic Graph (DAG) technology is widely applied in the field of blockchain, especially in an algorithm of Proof of Work (POW). The DAG technology solves problems of a low processing speed, a high cost, potential safety hazards, or the like, in a public blockchain. In public blockchain technology, since there is only one in-degree and one out-degree of a chain, it is impossible to split nodes on the chain into multiple nodes for handling. However, in the DAG technology there are multiple out-degrees and multiple nodes may be handled at the same time. In the algorithm of proof of work, a process of calculating and solving thereof is actually a process of retrieving data from a DAG file and operating. On a public blockchain, every generated new block will be linked to all previous blocks, and verification information of a new block contains encryption information of all previous blocks. The information refers to the DAG file, so the file will keep getting larger.

The inventor of the present application finds that with an increase of the DAG file, a final calculation result of a chip of proof of work will produce a large quantity of errors, and a service life is relatively short.

SUMMARY

The following is a summary of the subject matter described in detail in the present application, and this summary is not intended to limit the protection scope.

The embodiments of the present disclosure may prolong a service life of a chip of proof of work.

In one aspect, an embodiment of the present disclosure provides a chip of proof of work, including a central control unit, a unit for processing an external DAG, a storage unit, and a calculating unit, wherein the central control unit is configured to receive direct acyclic graph (DAG) data sent by an upper computer; the unit for processing an external DAG is configured to store the DAG data into the storage unit; the storage unit is configured to store the DAG data; and the calculating unit is configured to perform an operation on a proof of work according to the stored DAG data.

In an exemplary embodiment, the chip of proof of work also includes a unit for selecting a DAG generation mode, wherein the central control unit is further configured to receive a first command sent by the upper computer and schedule the unit for selecting a DAG generation mode; and the unit for selecting a DAG generation mode is configured to open a channel between the central control unit and the unit for processing an external DAG according to scheduling of the central control unit, enabling the unit for processing an external DAG to acquire the DAG data received by the central control unit.

In an exemplary embodiment, the chip of proof of work further includes a unit for generating an internal Cache and a unit for generating an internal DAG, wherein the central control unit is further configured to receive block information sent by the upper computer and schedule the unit for selecting a DAG generation mode; the unit for selecting a DAG generation mode is further configured to open a channel between the central control unit and the unit for generating an internal Cache according to scheduling of the central control unit, enabling the unit for generating an internal Cache to acquire the block information received by the central control unit; the unit for generating an internal Cache is configured to generate Cache data according to the received block information and store the Cache data into the storage unit; the storage unit is further configured to store the Cache data; and the unit for generating an internal DAG is configured to perform a calculation of DAG data according to the Cache data stored in the storage unit, and store the calculated and obtained DAG data into the storage unit.

In an exemplary embodiment, the chip of proof of work further includes an external bus interface unit, configured to receive a data packet sent by the upper computer, parse out DAG data from the data packet and send the DAG data to the central control unit.

In an exemplary embodiment, the chip of proof of work further includes an external bus interface unit, configured to receive a data packet sent by the upper computer, parse out block information from the data packet and send the block information to the central control unit.

In an exemplary embodiment, the chip of proof of work further includes a storage data access selection interface unit, wherein the central control unit is further used to receive a second command sent by the upper computer and schedule the storage data access selection interface unit; and the storage data access selection interface unit is connected with the storage unit and is configured to provide an access authority of the storage unit to the calculating unit according to scheduling of the central control unit.

In an exemplary embodiment, the unit for selecting a DAG generation mode opens a channel between the central control unit and the unit for processing an external DAG, including: a part of an address space in the central control unit is opened and it is opened to the unit for processing an external DAG, wherein the opened address space includes one or more pieces of the following information: write data, configured for storing DAG data; a write address, configured for storing an address of the DAG data; a write signal, which is configured to a value indicating that the DAG data has been written or a value indicating that the DAG data has not been written; and a whether-or-not writable signal, which is configured to a value indicating that DAG data is allowed to be writable or a value indicating that DAG data is not allowed to be writable; wherein values of the write data, the write address, and the write signal are set by the upper computer, and a value of the whether-or-not writable signal is set by the unit for processing an external DAG.

In an exemplary embodiment, the address space includes the following information: write data, a write address, a write signal, and a whether-or-not writable signal; the unit for processing an external DAG stores the DAG data into the storage unit, including: when the DAG data is determined to have been written according to the write signal, the whether-or-not writable signal being set to a value indicating that DAG data is not allowed to be writable, DAG data in an address space in the central control unit and its address being written into the storage unit, and after writing, the whether-or-not writable signal being set to a value indicating that DAG data is allowed to be writable.

In an exemplary embodiment, the central control unit is further configured to, after the calculating unit calculates a result that conforms to a requirement, feed back the result to the upper computer.

On the other hand, an embodiment of the present disclosure also provides a method for operation on a proof of work, applied to a chip of proof of work according to any embodiment of the present disclosure. The method includes: receiving direct acyclic graph (DAG) data sent by an upper computer; storing the DAG data into a storage unit; and performing an operation on a proof of work according to the stored DAG data.

In an exemplary embodiment, the chip of proof of work includes a unit for generating an internal Cache and a unit for generating an internal DAG, and the method further includes: receiving block information sent by the upper computer; generating Cache data according to the received block information, and storing the Cache data into the storage unit; performing a calculation of DAG data according to the Cache data stored in the storage unit, and storing the calculated and obtained DAG data into the storage unit.

In an exemplary embodiment, the method further includes: after a result that conforms to a requirement is calculated, feeding back the result to the upper computer.

On one hand, an embodiment of the present disclosure provides an upper computer configured to implement an algorithm of proof of work, including: a module for determining a data amount, a module for selecting an operation mode, and a module for controlling an operation, wherein the module for determining a data amount is configured to determine a sum of data amounts of Cache data and DAG data according to a calculation task for a proof of work; the module for selecting an operation mode is configured to determine whether the sum of the data amounts is greater than a capacity of a storage unit inside a chip of proof of work used to implement an Ethash algorithm, when yes, it is determined to adopt a first operation mode for generating DAG data outside the chip of proof of work, and when no, it is determined to adopt a second operation mode for generating DAG data inside the chip of proof of work; and the module for controlling an operation is configured to interact with the chip of proof of work to acquire a result of calculating the proof of work according to the adopted operation mode.

In an exemplary embodiment, the module for controlling an operation includes: a first module for controlling an operation, configured to calculate and obtain DAG data according to block information of the calculation task when the first operation mode is determined to be adopted and send the DAG data to the chip of proof of work; a second module for controlling an operation, configured to send the block information of the calculation task to the chip of proof of work when the second operation mode is determined to be adopted; and a module for acquiring a calculation result, configured to acquire the result of calculating the proof of work performed by the chip of proof of work.

In an exemplary embodiment, the chip of proof of work is a chip of proof of work including a unit for selecting a DAG generation mode; and the first module for controlling an operation includes: a first control unit, configured to send a first command to the chip of proof of work, control the unit for selecting a DAG generation mode to open a part of an address space in the central control unit and open it to the unit for processing an external DAG; a unit for generating data, configured to calculate and obtain DAG data according to the block information; and a unit for writing data, configured to write the DAG data into the address space opened by the central control unit to the unit for processing an external DAG.

In an exemplary embodiment, the address space opened to the unit for processing an external DAG includes the following information: write data, configured for storing DAG data; a write address, configured for storing the DAG data; a write signal, which is configured to a value indicating that the DAG data has been written or a value indicating that the DAG data has not been written; and a whether-or-not writable signal, which is configured to a value indicating that DAG data is allowed to be writable or a value indicating that DAG data is not allowed to be writable; wherein values of the write data, the write address, and the write signal are set by the upper computer, and a value of the whether-or-not writable signal is set by the unit for processing an external DAG; and the unit for writing data writes the DAG data into the address space opened to the unit for processing an external DAG, including: when it is determined according to the whether-or-not writable signal that the DAG data can be written into the chip of proof of work, the generated DAG data and its address are respectively written into spaces corresponding to the write data and the write address, and after writing, the write signal is set to the value indicating that the DAG data has been written.

On the one hand, an embodiment of the present disclosure provides a method for operation on a proof of work, applied to an upper computer according to any embodiment of the present disclosure. The method includes: determining a sum of data amounts of Cache data and DAG data according to a calculation task for a proof of work; determining whether the sum of the data amounts is greater than a capacity of a storage unit inside a chip of proof of work used to implement an Ethash algorithm, when yes, determining to adopt a first operation mode for generating DAG data outside the chip of proof of work, and when no, determining to adopt a second operation mode for generating DAG data inside the chip of proof of work; and interacting with the chip of proof of work to acquire a result of calculating the proof of work according to the adopted operation mode.

In an exemplary embodiment, interacting with the chip of proof of work to acquire a result of a proof of work calculation according to the operation mode adopted includes: calculating and obtaining DAG data according to block information of the calculation task when the first operation mode is determined to be adopted and sending the DAG data to the chip of proof of work; sending the block information of the calculation task to the chip of proof of work when the second operation mode is determined to be adopted; and acquiring the result of calculating the proof of work performed by the chip of proof of work.

In one aspect, the embodiment of the present disclosure provides a computer program product including computer programs, which when executed by a processor, can perform the method for operation on a proof of work in any one embodiment of the present disclosure.

In one aspect, the embodiment of the present disclosure provides a non-transitory computer readable storage medium storing computer programs, which when executed by a processor, can perform the method for operation on a proof of work in any one embodiment of the present disclosure.

After the drawings and detailed description are read and understood, the other aspects may be understood.

BRIEF DESCRIPTION OF DRAWINGS

The attached drawings are used to provide understanding of technical solutions of the present disclosure, and constitute a part of the specification. They are used together with the embodiments of the present disclosure to explain the technical solutions of the present disclosure, and do not constitute a restriction on the technical solutions of the present disclosure. The shape and size of each component in the drawings does not reflect true proportions and are intended to schematically explain contents of the present disclosure only.

DETAILED DESCRIPTION

Figure 1:
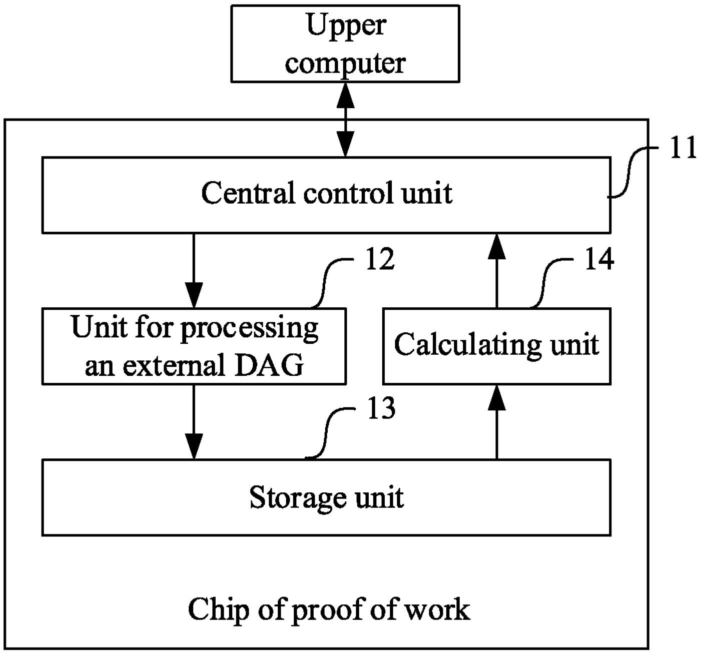
FIG. 1 is a schematic diagram of a structure of a chip of proof of work according to an embodiment of the present disclosure.

Multiple embodiments are described in the present disclosure, but the description is exemplary and not limiting, and it will be apparent to those of ordinary skill in the art that there may be more embodiments and implementation solutions within a scope contained in the embodiments described in the present disclosure. Although many possible combinations of features are shown in the drawings and discussed in specific embodiments, many other combination modes of the disclosed features are also possible. Except where purposely limited, any feature or element of any embodiment may be used in conjunction with, or in place of any other feature or element of any other embodiment.

The present disclosure includes and contemplates combinations of features and elements known to those of ordinary skill in the art. The already disclosed embodiments, features, and elements of the present disclosure may be combined with any conventional feature or element to form a unique inventive solution defined by the claims. Any feature or element of any embodiment may be combined with a feature or an element from another inventive solution to form another unique inventive solution defined by the claims. Thus, it should be understood that any of the features shown and/or discussed in the present disclosure may be implemented alone or in any suitable combination. Thus, the embodiments are not subject to limitations other than those made in accordance with the appended claims and their equivalent substitutions. In addition, various modifications and changes may be made within the protection scope of the appended claims.

In addition, in describing representative embodiments, the specification may have presented the method and/or the process as a particular sequence of acts. However, to an extent that the method or the process does not depend on a particular order of the acts described herein, the method or the process should not be limited to the acts of the particular order. As will be understood by those of ordinary skill in the art, another order of acts is also possible. Therefore, the particular order of acts set forth in the specification should not be construed as limiting the claims. Furthermore, the claims for the method and/or the process should not be limited to the acts of performing them in the written orders, and those skilled in the art may readily understand that these orders may vary and still remain within the spirit and the scope of the disclosed embodiments.

At present, when a chip of proof of work executes an algorithm of proof of work, firstly, random data set (Cache) data (an intermediate value for generating DAG data) is calculated through block information, then the DAG data is generated by using the Cache data, and finally, a complex logical operation is performed by randomly accessing the DAG data, obtaining a result of a proof of work. According to a general structure and a working process of a chip of proof of work, due to a limitation of chip technology and a limitation of a process manufacturing difficulty, its memory capacity is upgraded relatively slowly and will not increase indefinitely. With elapsing of time, the data of Cache and DAG will become larger and larger. In a normal case, the size of Cache increases by 128 KB every 5.2 days, and the size of DAG increases by 8 MB every 5.2 days. Assuming that a storage unit of the chip of proof of work is 5 GB in size, after a total size of the Cache data and the DAG data is greater than a memory capacity of the chip of proof of work, a calculating unit will access incomplete DAG data, and then produce a large amount of calculation error data, resulting in an inability to continue to use the chip of proof of work and a relatively short life.

For this reason, an embodiment of the present disclosure provides a chip of proof of work, as shown in FIG. 1, including a central control unit 11, a unit 12 for processing an external DAG, a storage unit 13, and a calculating unit 14, wherein the central control unit 11 is configured to receive direct acyclic graph (DAG) data sent by an upper computer; the unit 12 for processing an external DAG is configured to store the DAG data into the storage unit 13; the storage unit 13 is configured to store the DAG data; and the calculating unit 14 is configured to perform an operation on a proof of work according to the stored DAG data.

In some technical schemes, when DAG is generated, Cache data need to be generated first, and then DAG data is generated based on the Cache data. Therefore, when generating the DAG data internally, the chip of proof of work needs to reserve a part of storage space to store the Cache data. However, the chip of proof of work of the present embodiment does not need to generate DAG data, the upper computer directly sends the DAG data to the chip of proof of work for processing, and the chip of proof of work only needs to store the DAG data without storing Cache data, prolonging a service life of the chip. The chip of proof of work may be used to implement an algorithm of proof of work including but not limited to an Ethash algorithm.

Figure 2:
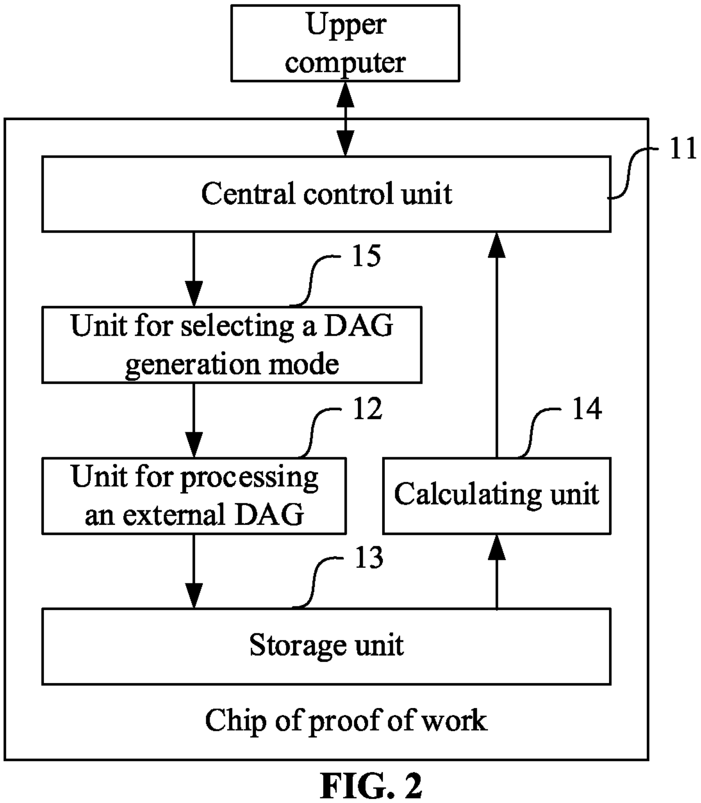
FIG. 2 is a schematic diagram of a structure of another chip of proof of work according to an embodiment of the present disclosure.

In an exemplary embodiment, as shown in FIG. 2, the chip of proof of work also includes a unit 15 for selecting a DAG generation mode, wherein the central control unit 11 is further configured to receive a first command sent by the upper computer and schedule the unit 15 for selecting a DAG generation mode; and the unit 15 for selecting a DAG generation mode is configured to open a channel between the central control unit 11 and the unit 12 for processing an external DAG according to scheduling of the central control unit 11, so that the unit 12 for processing an external DAG can acquire the DAG data received by the central control unit 11.

The unit for selecting a DAG generation mode may be, for example, a multiplexer (MUX) or a data path selector, but is not limited thereto.

Figure 3:
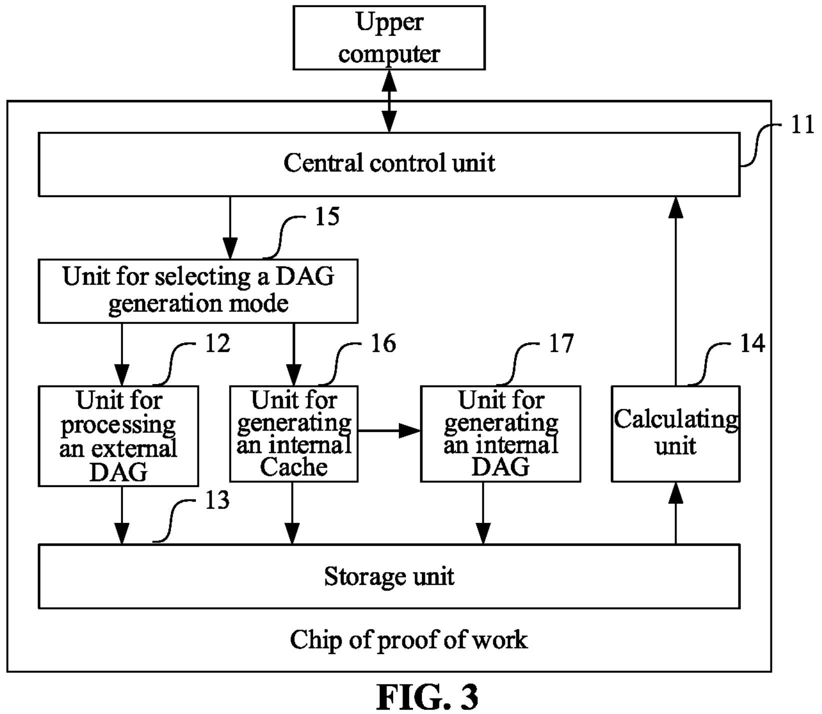
FIG. 3 is a schematic diagram of a structure of yet another chip of proof of work according to an embodiment of the present disclosure.

In an exemplary embodiment, as shown in FIG. 3, the chip of proof of work also includes a unit 16 for generating an internal Cache and a unit 17 for generating an internal DAG, wherein the central control unit 11 is further configured to receive block information sent by the upper computer and schedule the unit 16 for selecting a DAG generation mode; the unit 16 for selecting a DAG generation mode is further configured to open a channel between the central control unit 11 and the unit 16 for generating an internal Cache according to scheduling of the central control unit 11, so that the unit 16 for generating an internal Cache can acquire the block information received by the central control unit 11; the unit 16 for generating an internal Cache is configured to generate Cache data according to the received block information and store the Cache data into the storage unit 13; the storage unit 13 is further configured to store the Cache data; and the unit 17 for generating an internal DAG is configured to perform a calculation of DAG data according to the Cache data stored in the storage unit 13, and store the calculated and obtained DAG data into the storage unit 13.

Specifically, after generating the Cache data, the unit 16 for generating an internal Cache may call the unit 17 for generating an internal DAG to generate the DAG data.

In the present embodiment, the differential processing may be performed according to whether a sum of a size of Cache data and a size of DAG data is greater than an internal storage capacity of the chip of proof of work. When it is not greater than the internal storage capacity, the Cache data and the DAG data are still generated by an internal unit, and the storage unit stores the Cache data and the DAG data. When it is greater than the internal storage capacity, the DAG data is generated externally and the storage unit only needs to store the DAG data, and there is no need to generate the Cache data to occupy a capacity of the storage unit, so that there is an enough space to ensure an integrity of the DAG data, and the algorithm of proof of work can still be continued to run, thus prolonging a service life of the chip.

Figure 4:
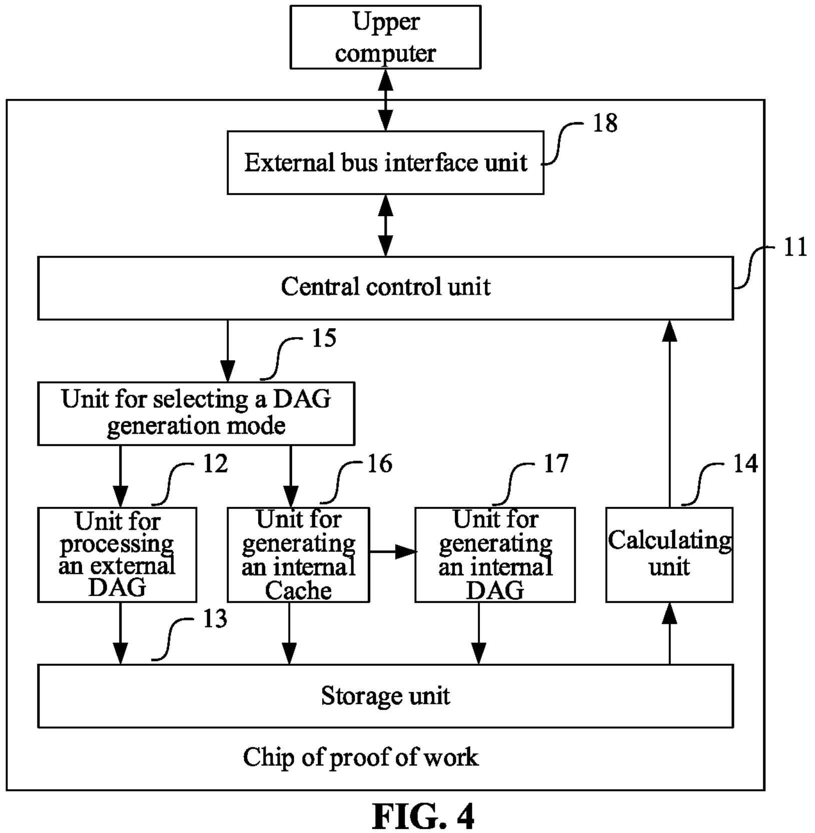
FIG. 4 is a schematic diagram of a structure of yet another chip of proof of work according to an embodiment of the present disclosure.

In an exemplary embodiment, as shown in FIG. 4, the chip of proof of work also includes an external bus interface unit 18, wherein the external bus interface unit 18 is configured to receive a data packet sent by the upper computer, parsing out DAG data from the data packet and sending the DAG data to the central control unit 11.

The external bus interface unit 18 is an external communication interface and is responsible for communicating with an upper computer outside the chip.

In another exemplary embodiment, the external bus interface unit 18 may also be configured to receive a data packet sent by the upper computer, parsing out block information from the data packet and sending the block information to the central control unit 11.

Figure 5:
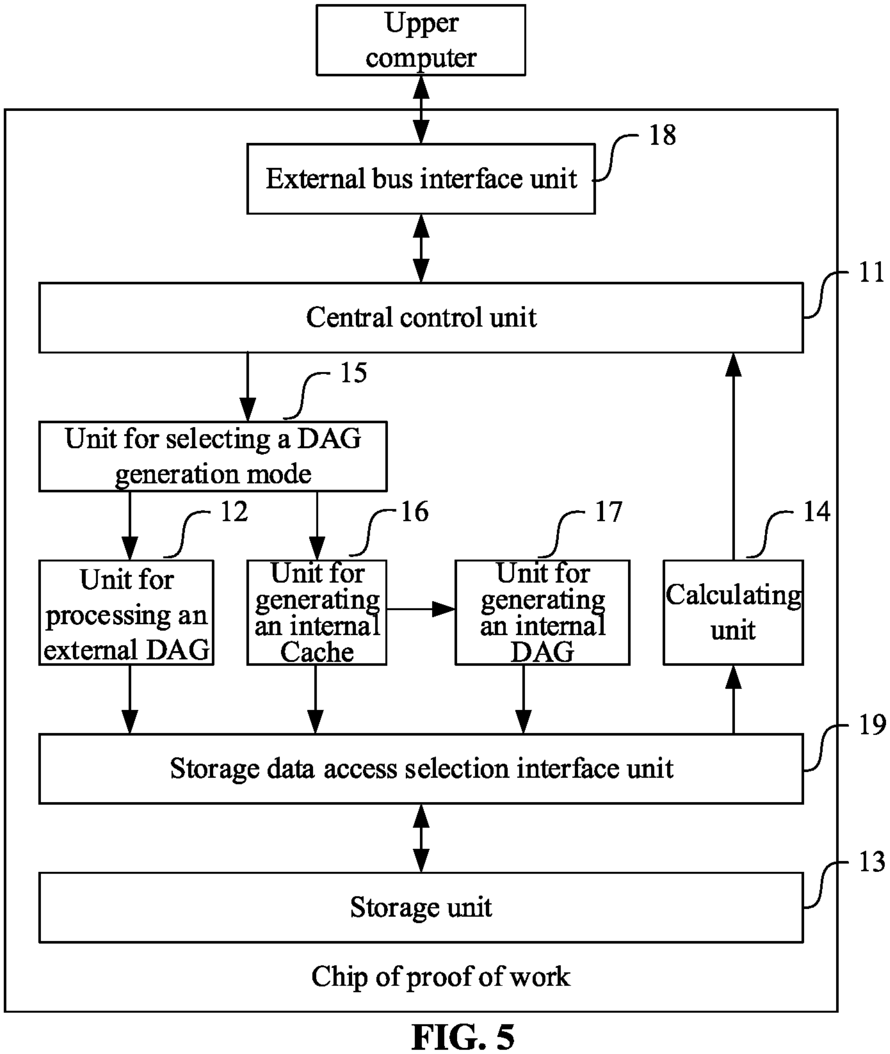
FIG. 5 is a schematic diagram of a structure of yet another chip of proof of work according to an embodiment of the present disclosure.

In an exemplary embodiment, as shown in FIG. 5, the chip of proof of work also includes a storage data access selection interface unit 19, wherein the central control unit is further configured to receive a second command sent by the upper computer and schedule the storage data access selection interface unit; and the storage data access selection interface unit 19 is connected with the storage unit and is configured to provide an access authority of the storage unit to the calculating unit according to scheduling of the central control unit.

Since there is only one path of operation interface in the storage unit 13 and each circuit unit cannot access the storage unit 13 at the same time, the storage data access selection interface unit 19 is disposed for providing an access authority to operate the storage unit 13.

In an exemplary embodiment, the central control unit is further configured to, after the calculating unit calculates a result that conforms to a requirement, feed back the result to the upper computer.

In an exemplary embodiment, the unit for selecting a DAG generation mode opens a channel between the central control unit and the unit for processing an external DAG, including: a part of an address space in the central control unit is opened and it is opened to the unit for processing an external DAG, wherein the opened address space includes one or more pieces of the following information: write data, configured for storing DAG data; a write address, configured for storing an address of the DAG data; a write signal, which is configured to a value indicating that the DAG data has been written or a value indicating that the DAG data has not been written; and a whether-or-not writable signal, which is configured to a value indicating that DAG data is allowed to be writable or a value indicating that DAG data is not allowed to be writable; wherein values of the write data, the write address, and the write signal are set by the upper computer, and a value of the whether-or-not writable signal is set by the unit for processing an external DAG.

In an exemplary embodiment, the address space includes the following information: write data, a write address, a write signal, and a whether-or-not writable signal; the unit for processing an external DAG stores the DAG data into the storage unit, including: when the DAG data is determined to have been written according to the write signal, the whether-or-not writable signal is set to a value indicating that DAG data is not allowed to be writable, DAG data in an address space in the central control unit 11 and its address are written into the storage unit 13, and after writing, the whether-or-not writable signal is set to a value indicating that DAG data is allowed to be writable.

The chip of proof of work according to the embodiment of the present disclosure may prolong a service period of the chip after a sum of a capacity of Cache data and a capacity of DAG data is greater than a capacity of the storage unit, so that the chip continues to operate and acquire a correct calculation result.

Figure 6:
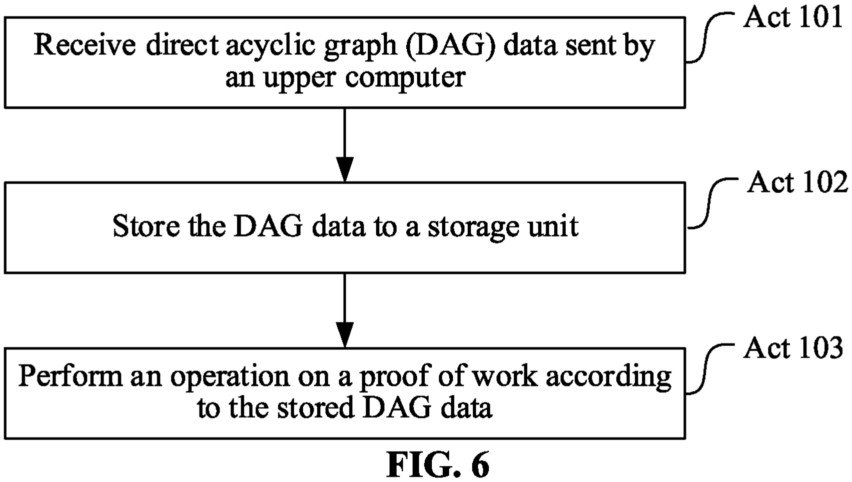
FIG. 6 is a flowchart of a method for operation on a proof of work on a chip of proof of work side according to an embodiment of the present disclosure.

An embodiment of the present disclosure also provides a method for operation on a proof of work, applied to a chip of proof of work according to any embodiment of the present disclosure. As shown in FIG. 6, the operating method includes the following acts 101 to 103.

In act 101, direct acyclic graph (DAG) data sent by an upper computer is received.

In act 102, the DAG data is stored into a storage unit.

In act 103, an operation on a proof of work is performed according to the stored DAG data.

By adopting the method for processing the chip of proof of work in the present embodiment, through receiving the DAG data sent by the upper computer for processing, only the DAG data need to be stored, thereby having a sufficient space to ensure an integrity of DAG data, thereby prolonging a service life of the chip.

In an exemplary embodiment, the chip of proof of work may generate DAG data internally, and prior to act 103, the method may also include the following acts 201 to 203.

In act 201, block information sent by the upper computer is received.

In act 202, Cache data is generated according to the received block information, and the Cache data is stored into the storage unit.

In act 203, a calculation of DAG data is performed according to the Cache data stored in the storage unit, and the calculated and obtained DAG data is stored into the storage unit.

In the present embodiment, when a sum of a size of the Cache data and a size of the DAG data is not greater than an internal storage capacity of the chip of proof of work, an internal unit still generates the Cache data and the DAG data, and the storage unit stores the Cache data and the DAG data.

In an exemplary embodiment, after act 103, the method also includes a following act 104.

In act 104, after calculating a result conforming to a requirement, the result is fed back to the upper computer.

By adopting the method for processing the chip of proof of work according to the embodiment of the present disclosure, a service period of the chip may be prolonged after a sum of a capacity of Cache data and a capacity of DAG data is greater than a capacity of the storage unit.

Figure 7:
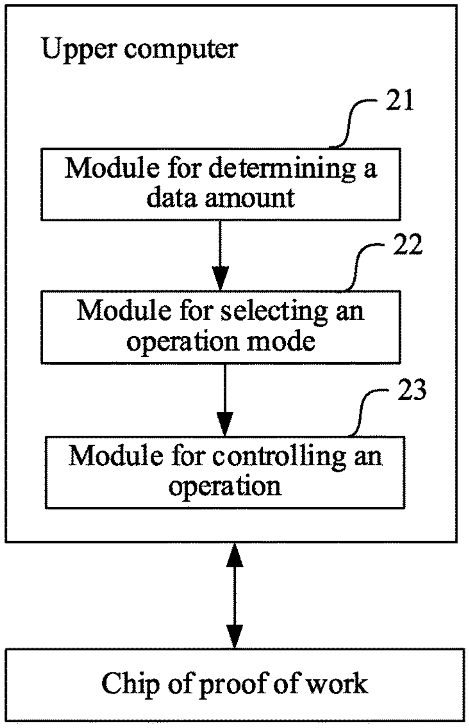
FIG. 7 is a module diagram of an upper computer according to an embodiment of the present disclosure.

An embodiment of the present disclosure also provides an upper computer configured to implement an algorithm of proof of work, which, as shown in FIG. 7, including a module 21 for determining a data amount, a module 22 for selecting an operation mode, and a module 23 for controlling an operation, wherein the module 21 for determining a data amount is configured to determine a sum of data amounts of Cache data and DAG data according to a calculation task for a proof of work; the module 22 for selecting an operation mode is configured to determine whether the sum of the data amounts is greater than a capacity of a storage unit inside a chip of proof of work used to implement an Ethash algorithm, when yes, it is determined to adopt a first operation mode for generating DAG data outside the chip of proof of work, and when no, it is determined to adopt a second operation mode for generating DAG data inside the chip of proof of work; and the module 23 for controlling an operation is configured to interact with the chip of proof of work to acquire a result of calculating the proof of work according to the adopted operation mode.

In an exemplary embodiment, the module for controlling an operation includes: a first module for controlling an operation, configured to calculate and obtain DAG data according to block information of the calculation task when the first operation mode is determined to be adopted and send the DAG data to the chip of proof of work; a second module for controlling an operation, configured to send the block information of the calculation task to the chip of proof of work when the second operation mode is determined to be adopted; and a module for acquiring a calculation result, configured to acquire the result of calculating the proof of work performed by the chip of proof of work.

In an exemplary embodiment, the chip of proof of work is a chip of proof of work including a unit for selecting a DAG generation mode in the embodiment of the present disclosure; and the first module for controlling an operation includes: a first control unit, configured to send a first command to the chip of proof of work, control the unit for selecting a DAG generation mode to open a part of an address space in the central control unit and open it to the unit for processing an external DAG; a unit for generating data, configured to calculate and obtain DAG data according to the block information (obtaining the DAG data after generating Cache data); and a unit for writing data, configured to write the DAG data into the address space opened by the central control unit to the unit for processing an external DAG.

In an exemplary embodiment, the address space opened to the unit for processing an external DAG includes the following information: write data, configured for storing DAG data; a write address, configured for storing the DAG data; a write signal, which is configured to a value indicating that the DAG data has been written or a value indicating that the DAG data has not been written; and a whether-or-not writable signal, which is configured to a value indicating that DAG data is allowed to be writable or a value indicating that DAG data is not allowed to be writable; wherein values of the write data, the write address, and the write signal are set by the upper computer, and a value of the whether-or-not writable signal is set by the unit for processing an external DAG; and the unit for writing data writes the DAG data into the address space opened to the unit for processing an external DAG, including: when it is determined according to the whether-or-not writable signal that the DAG data can be written into the chip of proof of work, the generated DAG data and its address are respectively written into spaces corresponding to the write data and the write address, and after writing, the write signal is set to the value indicating that the DAG data has been written.

Figure 8:
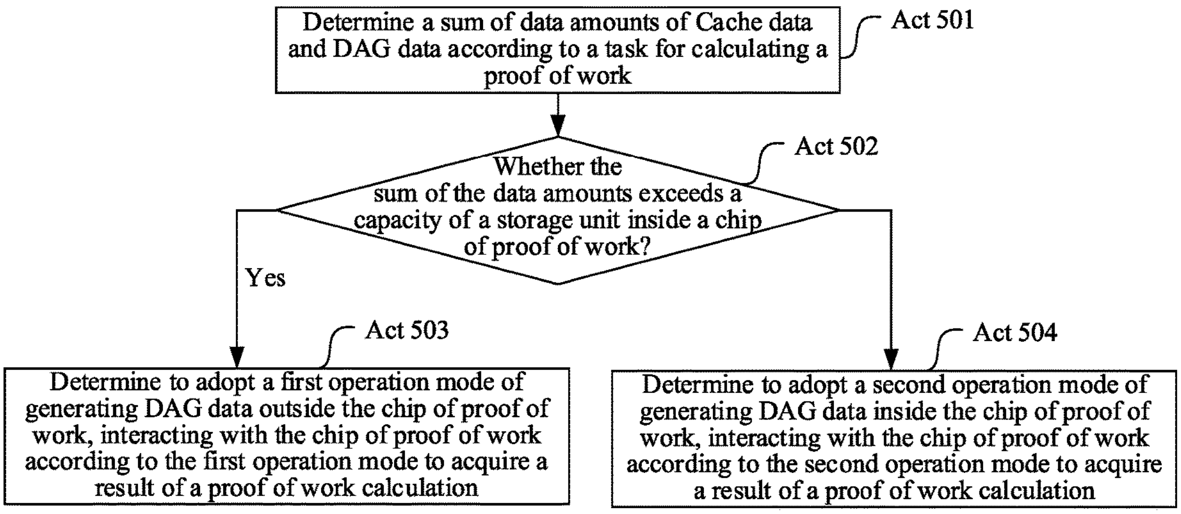
FIG. 8 is a flowchart of a method for operation on a proof of work on an upper computer side according to an embodiment of the present disclosure.

An embodiment of the present disclosure also provides a method for operation on a proof of work, applied to the upper computer of any embodiment of the present disclosure. As shown in FIG. 8, the method includes the following acts 501 to 504.

In act 501, a sum of data amounts of Cache data and DAG data is determined according to a calculation task for a proof of work.

In act 502, it is determined whether the sum of the data amounts is greater than a capacity of a storage unit inside a chip of proof of work used to implement an algorithm of proof of work, when yes, act 503 is executed, and when no, act 504 is executed.

In act 503, a first operation mode of generating DAG data outside the chip of proof of work is determined to be adopted, interacting with the chip of proof of work according to the first operation mode to acquire a result of calculating the proof of work, ending.

In act 504, a second operation mode of generating DAG data inside the chip of proof of work is determined to be adopted, interacting with the chip of proof of work according to the second operation mode to acquire a result of calculating the proof of work, ending.

In an exemplary embodiment, interacting with the chip of proof of work according to the operation mode adopted to acquire a result of calculating a proof of work includes: calculating and obtaining DAG data according to block information of the calculation task (obtaining the DAG data after generating Cache data) when the first operation mode is determined to be adopted and sending the DAG data to the chip of proof of work; sending the block information of the calculation task to the chip of proof of work when the second operation mode is determined to be adopted; and acquiring the result of calculating the proof of work performed by the chip of proof of work.

The upper computer and the method for operation on a proof of work on an upper computer side according to the embodiment of the present disclosure may generate DAG data on the upper computer side and then send the DAG data to the chip of proof of work, so that a requirement on a storage capacity of the chip of proof of work may be reduced and a life of the chip of proof of work may be prolonged.

A method for processing the above chip of proof of work is explained by specific examples below.

First Example

Figure 9:
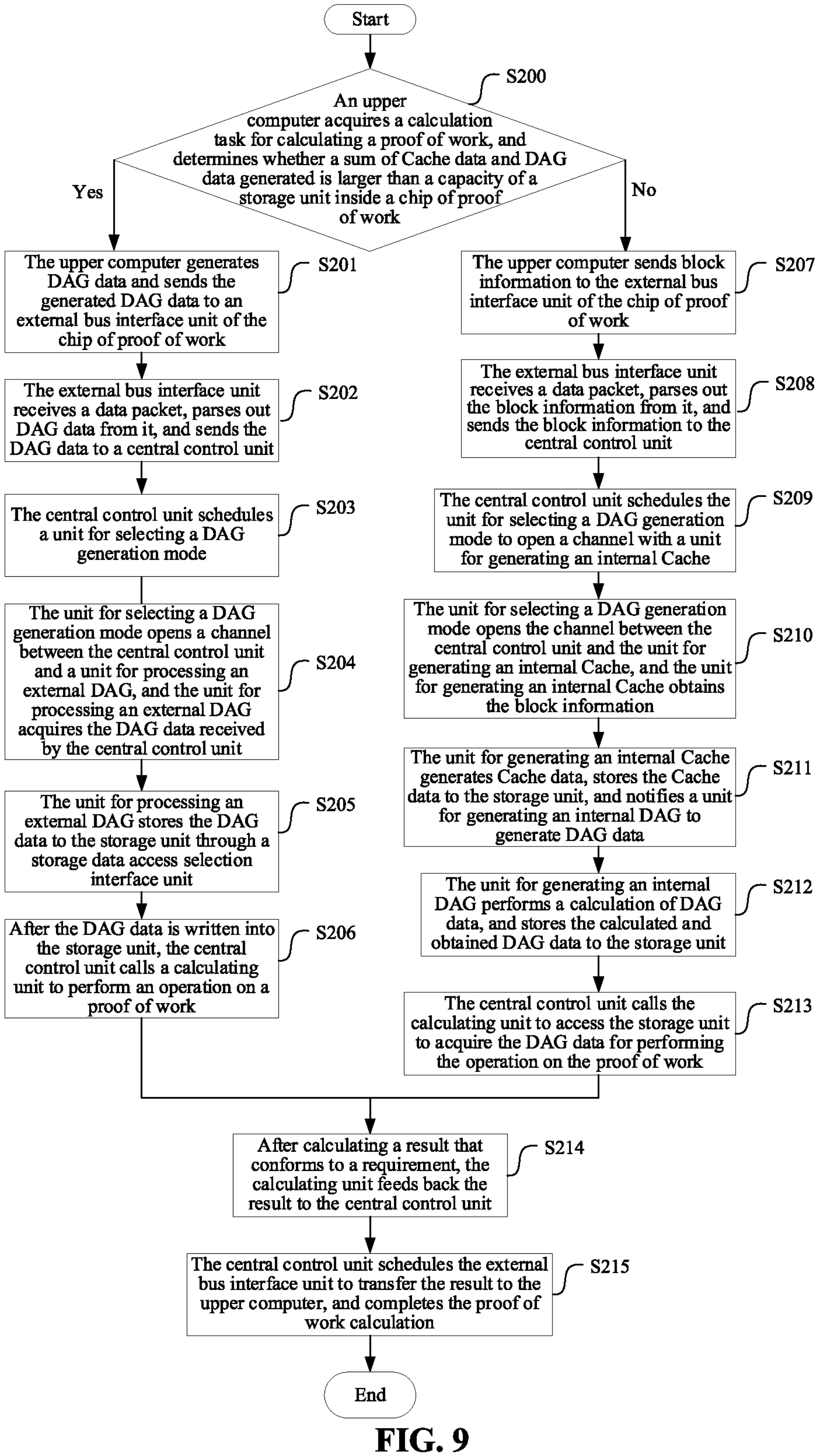
FIG. 9 is a flowchart of processing of a first example according to an embodiment of the present disclosure.

In this example, a workflow of the chip of proof of work may be as shown in FIG. 9, the chip of proof of work in this example may be the chip shown in FIG. 5, and the workflow includes the following acts S200 to S215.

In S200, the upper computer acquires the calculation task for calculating a proof of work from a network, and determines, according to block information, whether a sum of Cache data generated by the block information and DAG data generated by the Cache data is greater than the capacity of the storage unit of the chip of proof of work, when yes, act S201 is executed, and when no, act S202 is executed.

In an exemplary embodiment, the upper computer may calculate and obtain a size of the Cache data generated by the block information and a size of the DAG data generated by the Cache data through an algorithm, and obtain a sum of the two parts of data through a summation. Or the upper computer may process the block information, directly generate Cache data, and then obtain a size of the Cache data, and process the Cache data to generate DAG data, obtain a size of the DAG data, and then obtain a sum of the two parts of data through a summation.

When a sum of Cache data and DAG data is greater than the capacity of the storage unit, the DAG data will be generated by the upper computer and transferred to the chip of proof of work, so that the storage unit inside the chip of proof of work may only store the DAG data. When the sum of the Cache data and the DAG data is less than or equal to the capacity of the storage unit, the DAG data may still be generated by the chip of proof of work.

In another embodiment, when the sum of the Cache data and the DAG data is equal to the capacity of the storage unit, the DAG data may also be generated by the upper computer.

In S201, the upper computer generates DAG data and sends the generated DAG data to the external bus interface unit of the chip of proof of work.

In an exemplary embodiment, the upper computer may achieve a function of generating DAG data by installing a corresponding software program.

In S202, the external bus interface unit receives a data packet, parses out DAG data from the received data packet, and sends the DAG data to the central control unit.

The parsing includes, for example, parsing a message header and reading the DAG data from a message body.

In S203, the central control unit schedules the unit for selecting a DAG generation mode according to the received DAG data.

The central control unit 11 is responsible for scheduling each part of circuit unit in the chip. Instructions corresponding to different data are preset inside the central control unit 11, and corresponding instructions may be triggered according to received data to schedule different units to work. For example, the central control unit may trigger a preset instruction according to the received DAG data, and schedule the unit for selecting a DAG generation mode according to the instruction.

In S204, the unit for selecting a DAG generation mode opens a channel between the central control unit and the unit for processing an external DAG according to scheduling of the central control unit, and the unit for processing an external DAG acquires the DAG data received by the central control unit.

In S205, the unit for processing an external DAG stores the DAG data into the storage unit through the storage data access selection interface unit.

In S206, after the DAG data is written into the storage unit, the central control unit calls the calculating unit to perform an operation on a proof of work, and act S214 is executed.

In S207, the upper computer sends the block information to the external bus interface unit of the chip of proof of work.

In S208, the external bus interface unit receives a data packet, parses out the block information from the received data packet, and sends the block information to the central control unit.

In S209, the central control unit schedules the unit for selecting a DAG generation mode according to the received block information, to open a channel with the unit for generating an internal Cache.

In S210, the unit for selecting a DAG generation mode opens the channel between the central control unit and the unit for generating an internal Cache according to scheduling of the central control unit, and the unit for generating an internal Cache obtains the block information received by the central control unit.

In S211, the unit for generating an internal Cache generates Cache data according to the received block information according to scheduling of the central control unit, stores the Cache data into the storage unit through the storage data access selection interface unit, and notifies the unit for generating an internal DAG to generate DAG data.

In S212, the unit for generating an internal DAG performs a calculation of DAG data according to the Cache data stored in the storage unit, stores the calculated and obtained DAG data into the storage unit, and notifies the central control unit that the calculation is completed. In S213, the central control unit calls the calculating unit to access the storage unit to acquire the DAG data for performing the operation on the proof of work.

In S214, after calculating a result that conforms to a requirement, the calculating unit feeds back the result to the central control unit.

In S215, the central control unit schedules the external bus interface unit to transfer the result to the upper computer, and completes the calculation of proof of work.

Second Example

Figure 10:
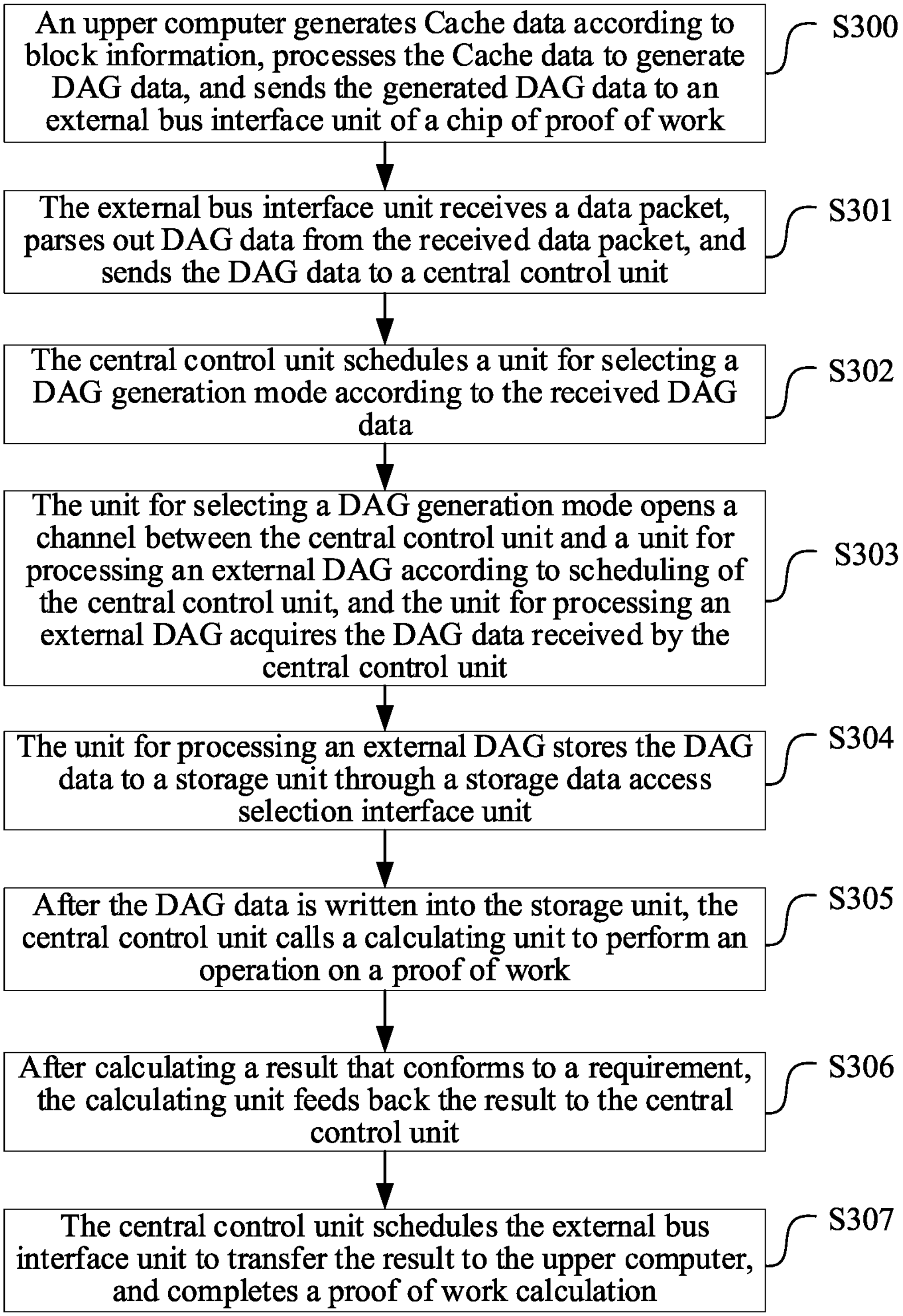
FIG. 10 is a flowchart of processing of a second example according to an embodiment of the present disclosure.

In this example, a workflow of the chip of proof of work may be as shown in FIG. 10, the chip of proof of work in this example may be the chip shown in FIG. 2, and the workflow includes the following acts S300 to S307.

In S300, the upper computer acquires the calculation task for calculating a proof of work from a network, generates Cache data according to block information, and processes the Cache data to generate DAG data, and sends the generated DAG data to the external bus interface unit of the chip of proof of work.

In S301, the external bus interface unit receives a data packet, parses out DAG data from the received data packet, and sends the DAG data to the central control unit.

In S302, the central control unit schedules the unit for selecting a DAG generation mode according to the received DAG data.

In S303, the unit for selecting a DAG generation mode opens a channel between the central control unit and the unit for processing an external DAG according to scheduling of the central control unit, and the unit for processing an external DAG acquires the DAG data received by the central control unit.

In another exemplary embodiment, the central control unit may directly send the DAG data to the unit for processing an external DAG without setting the unit for selecting a DAG generation mode.

In S304, the unit for processing an external DAG stores the DAG data into the storage unit through the storage data access selection interface unit.

In S305, after the DAG data is written into the storage unit, the central control unit calls the calculating unit to perform an operation on a proof of work.

In S306, after calculating a result that conforms to a requirement, the calculating unit feeds back the result to the central control unit.

In S307, the central control unit schedules the external bus interface unit to transfer the result to the upper computer, and completes the calculation of proof of work.

In an embodiment of the present disclosure, two modes of generating DAG may be adopted: an external generation and an internal generation. When a total capacity of Cache data and DAG data is greater than the capacity of the storage unit, the upper computer may send an instruction to shut down the unit for generating an internal CACHE and the unit for generating an internal DAG and use the unit for processing an external DAG. DAG data may be generated by the upper computer and transferred to the unit for processing an external DAG to complete filling of DAG data in the storage unit. The embodiment of the invention utilizes a CACHE space which cannot be used in the storage unit originally to store DAG data, thereby prolonging a service life of the chip. Assume that a current storage capacity of a memory is 5 GB, and a capacity of CACHE is 128 MB, at this time the size of DAG data is 4.87 GB. When the chip cannot work, an external generation of DAG data is started, then the chip may use 128 MB of space to store DAG data, so that the size of DAG data actually stored in the storage unit of the chip becomes 5 GB. At a current growth rate of DAG, the chip may be prolonged for a use of 83 days, calculated by increasing 8 MB every 5.2 days.

Third Example

Figure 11:
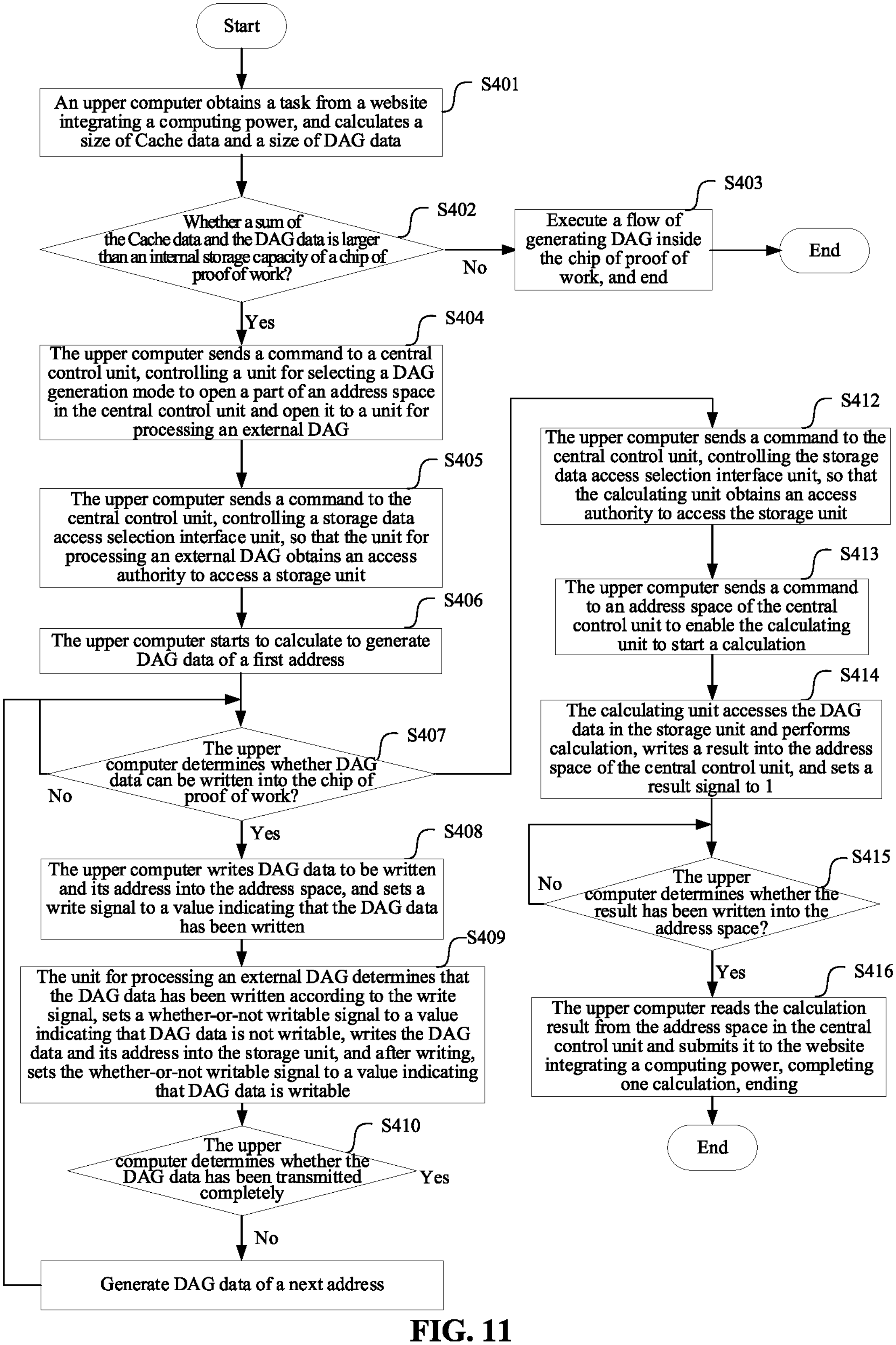
FIG. 11 is a flowchart of processing of a third example according to an embodiment of the present disclosure.

In this example, DAG data is generated outside the chip of proof of work (the DAG data is generated by the upper computer). The chip of proof of work may be the chip shown in FIG. 4. A flow of a method for operation on a proof of work in this example is shown in FIG. 11, including the following acts S401 to S416.

In act S401, the upper computer obtains the calculation task for a proof of work from a website integrating a computing power, and calculates a size of Cache data and a size of DAG data according to seed information in the task.

In act S402, it is determined whether a sum of the size of the Cache data and the size of the DAG data is greater than an internal storage capacity of the chip of proof of work, if no, act 403 is executed, if yes, act 404 is executed.

In act 403, a method of generating DAG inside the chip of proof of work is executed, ending.

A flow branch of generating the DAG inside the chip of proof of work is no longer expanded and described herein, but a flow branch of generating the DAG outside the chip of proof of work is expanded and described only in act 404 and its subsequent acts.

In act 404, the upper computer sends a command to the central control unit 11, controlling the unit 15 for selecting a DAG generation mode to open a part of an address space in the central control unit 11 and open it to the unit 12 for processing an external DAG.

This part of the address space in the central control unit 11 is newly added. Information of the address space includes: a write address space_waddr, write data space_wdata, a write signal space_wvalid, and a whether-or-not writable signal space_wready. In this example, space_wdata is configured for storing DAG data; space_waddr is configured for storing an address of the DAG data; space_wvalid may be set to a value indicating that the DAG data has been written or to a value indicating that the DAG data has not been written; space_wready is one status signal that may be set to a value indicating that DAG data can be (or allowed to be) written or a value indicating that DAG data cannot be (or not allowed to be) written; wherein values of space_wdata, space_waddr, and space_wvalid are set by the upper computer, and a value of space_wready is set by the unit for processing an external DAG.

When sending a command to the central control unit 11, the upper computer may send the command to the central control unit 11 through the external bus interface unit 18, and other acts are the same.

In act 405, the upper computer sends a command to the central control unit 11, controlling the storage data access selection interface unit 19, so that the unit 12 for processing an external DAG obtains an access authority to access the storage unit 13.

In act 406, the upper computer starts to calculate DAG data to generate DAG data of a first address.

DAG data generated after starting the calculation is, for example, DAG data data_0 of a 0th address addr_0. At this time, data_0 is the DAG data to be written.

In act 407, the upper computer reads the whether-or-not writable signal of the address space in the central control unit 11, determines whether DAG data can be written into the chip of proof of work, when it is a writable signal, act 408 is executed, and when it is a not-writable signal, waiting.

In this act, if the space_wready signal in the address space is 1, it indicates that DAG data can be written into the chip of proof of work, and if the space_wready signal is 0, waiting.

In act 408, the upper computer writes DAG data to be written and its address into the address space in the central control unit 11, and after writing, a write signal is set to a value indicating that the DAG data has been written.

In this act, the DAG data to be written may be written into a space corresponding to space_wdata, the address of the DAG data to be written is written into a space corresponding to space_waddr, and after writing, 1 is written to space_wvalid in the address space, indicating that the DAG data has been written; the action of writing 1 to space_wvalid will cause space_wvalid to generate a high level that lasts for one clock cycle, and before writing, the upper computer may set the write signal to a value indicating that the DAG data has not been written.

In act 409, the unit 12 for processing an external DAG determines that the DAG data has been written according to the write signal, and the whether-or-not writable signal is set to a value indicating that DAG data is not allowed to be written, and the DAG data in the address space in the central control unit 11 and its address are written into the storage unit 13, and after writing, the whether-or-not writable signal is set to a value indicating that DAG data is allowed to be written.

In an example, the unit 12 for processing an external DAG detects that the space_wvalid signal is 1 and sets the space_wready signal to 0; and at the same time, a write signal mem wen (a high level that lasts for one clock cycle) is generated and sent to the storage unit 13, data in space_waddr and space_wdata are written into the storage unit 13, and then the space_wready signal is set to 1.

In act S410, the upper computer determines whether the DAG data has been transmitted completely, when it is not transmitted completely, act S411 is executed, and when it is transmitted completely, act S412 is executed.

In act S411, the upper computer generates DAG data of a next address, returning to act 407.

At this time, the DAG data of the next address generated by the upper computer is DAG data to be written.

In act S412, the upper computer sends a command to the central control unit 11, controlling the storage data access selection interface unit 19, so that the calculating unit 14 obtains an access authority to access the storage unit 13.

In act S413, the upper computer sends a command to an address space of the central control unit 11 to enable the calculating unit 11 to start a calculation.

In this act, the upper computer may write 1 to an alu_en register in the address space in the central control unit 11; the register drives an enable signal of the calculating unit 14, and the calculating unit 14 starts the calculation.

In act S414, the calculating unit 14 accesses the DAG data in the storage unit 13 and performs calculation, writes a calculation result into the address space of the central control unit 11, and a result signal in the address space is set to a value indicating that the result has been written.

In this example, the calculating unit 14 accesses the DAG data in the storage unit 13 and performs calculation. After a result that conforms to a requirement is calculated and obtained, the result is submitted to the central control unit 11 and written into a result register of its address space, and 1 is written to the result valid register, indicating that the result has been written into the address space.

In act S415, the upper computer polls and reads a result signal result valid of the address space, determines whether the result has been written into the address space, if yes, act S416 is executed, and if no, polling continues.

In act S416, the upper computer reads the calculation result from the address space in the central control unit 11 and submits it to a web site integrating a computing power, thus completing one calculation of ethash proof of work, ending.

In this example, the upper computer may read the calculation result from a result register of the address space in the central control unit 11.

In the embodiment of present disclosure, the upper computer sends the DAG data to a chip of proof of work for processing. The chip of proof of work only needs to store the DAG data, and there is no need to store Cache data. Thus, when a DAG file increases to an extent that the chip of proof of work cannot adopt a method of generating DAG internally, a method of generating DAG externally may be used, so that there is an enough space to ensure the integrity of DAG data and further a service life of a chip is prolonged.

In one aspect, the embodiment of the present disclosure provides a computer program product including computer programs, which when executed by a processor, can perform the method for operation on a proof of work in any one embodiment of the present disclosure.

In one aspect, the embodiment of the present disclosure provides a non-transitory computer readable storage medium storing computer programs, which when executed by a processor, can perform the method for operation on a proof of work in any one embodiment of the present disclosure.

In the description of the embodiments of the present disclosure, it should be noted that unless otherwise definitely specified and limited, terms "install", "connecting", and "connection" should be understood in a broad sense, for example, they may be a fixed connection, or a detachable connection, or an integrated connection; they may be a mechanical connection, or an electrical connection; or they may be directly connecting, or indirectly connecting through an intermediary, or an internal communication between two elements. For those of ordinary skills in the art, the meanings of the above terms in the present disclosure can be understood according to situations.

Those of ordinary skill in the art can understand that all or some of the acts, system, functional modules/units in apparatuses in the disclosed methods of above may be implemented as software, firmware, hardware, and appropriate combinations thereof. In hardware embodiments, a division between functional modules/units mentioned in the above description does not necessarily correspond to a division of physical components; for example, one physical component may have multiple functions, or one function or act may be performed cooperatively by several physical components. Some or all of the components may be implemented as software executed by a processor, such as a digital signal processor or a microprocessor, or as hardware, or as an integrated circuit, such as an application specific integrated circuit. Such software may be distributed on a computer-readable medium, wherein the computer-readable medium may include a computer storage medium (or a non-transitory medium) and a communication medium (or a transitory medium). As is well known to those of ordinary skill in the art, the term computer storage medium includes volatile and non-volatile, removable and non-removable media implemented in any method or technique for storing information (such as computer-readable instructions, data structures, program modules, or other data). The computer storage medium includes, but is not limited to, RAM, ROM, EEPROM, a flash memory, or another memory technology, CD-ROM, a digital versatile disk (DVD) or another optical disk storage, a magnetic cartridge, a magnetic tape, a magnetic disk storage, or another magnetic storage apparatus, or any other medium that may be used to store desired information and may be accessed by a computer. In addition, it is well known to those of ordinary skill in the art that the communication medium typically contains computer readable instructions, data structures, program modules, or other data in modulated data signals such as carriers or another transmission mechanism, and may include any information delivery medium.

What is claimed is:

1. A chip of proof of work, comprising a processor and a memory, wherein the memory stores processor-executable programs, and the programs comprise a central control unit, a unit for selecting a DAG generation mode, a unit for processing an external DAG, a unit for generating an internal Cache, a unit for generating an internal DAG, a storage unit, and a calculating unit, wherein the central control unit is configured to receive direct acyclic graph (DAG) data sent by an upper computer, and a first command sent by the upper computer, wherein the first command is used to schedule the unit for selecting a DAG generation mode to open a channel between the central control unit and the unit for processing an external DAG; and further configured to receive block information sent by the upper computer, wherein the block information is used to schedule the unit for selecting a DAG generation mode to open a channel between the central control unit and the unit for generating an internal Cache;

the unit for selecting a DAG generation mode is configured to open the channel between the central control unit and the unit for processing an external DAG according to scheduling of the central control unit, enabling the unit for processing an external DAG to acquire the DAG data received by the central control unit; and further configured to open the channel between the central control unit and the unit for generating an internal Cache according to scheduling of the central control unit, enabling the unit for generating an internal Cache to acquire the block information received by the central control unit;

the unit for processing an external DAG is configured to store the DAG data into the storage unit;

the unit for generating an internal Cache is configured to generate Cache data according to the received block information and store the Cache data into the storage unit;

the unit for generating an internal DAG is configured to perform a calculation of DAG data according to the Cache data stored in the storage unit, and store the calculated DAG data obtained into the storage unit;

the storage unit is configured to store the DAG data; and further configured to store the Cache data;

the calculating unit is configured to perform an operation on a proof of work according to the stored DAG data.

2. The chip of proof of work according to claim 1, wherein the programs further comprise a storage data access selection interface unit, wherein:

the central control unit is further configured to receive a second command sent by the upper computer and schedule the storage data access selection interface unit;

the storage data access selection interface unit is connected with the storage unit and is configured to provide an access authority of the storage unit to the calculating unit according to scheduling of the central control unit.

3. The chip of proof of work according to claim 1, wherein that the unit for selecting a DAG generation mode is configured to open a channel between the central control unit and the unit for processing an external DAG, comprises: the unit for selecting a DAG generation mode is configured to open a part of an address space in the central control unit to the unit for processing an external DAG, wherein the opened part of the address space comprises one or more pieces of following information:

write data, configured for storing the DAG data;

a write address, configured for storing an address of the DAG data;

a write signal, which is configured to a value indicating that the DAG data has been written or a value indicating that the DAG data has not been written; and a whether-or-not writable signal, which is configured to a value indicating that DAG data is allowed to be writable or a value indicating that DAG data is not allowed to be writable;

wherein values of the write data, the write address and the write signal are set by the upper computer, and a value of the whether-or-not writable signal is set by the unit for processing an external DAG.

4. The chip of proof of work according to claim 3, wherein the address space comprises following information: write data, a write address, a write signal, and a whether-or-not writable signal;

that the unit for processing an external DAG is configured to store the DAG data into the storage unit, comprises: the unit for processing an external DAG is configured to, when determining that the DAG data has been written according to the write signal, set the whether-or-not writable signal to a value indicating that DAG data is not allowed to be writable, write DAG data in the address space in the central control unit and an address of the DAG data into the storage unit, and after the writing, set the whether-or-not writable signal to a value indicating that DAG data is allowed to be writable.

5. The chip of proof of work according to claim 1, wherein the central control unit is further configured to, after the calculating unit calculates a result that conforms to a requirement, feedback the result to the upper computer.

6. A method for operation on a proof of work, applied to a chip of proof of work according to claim 1, the method comprising:

receiving direct acyclic graph (DAG) data sent by an upper computer;

storing the DAG data into a storage unit;

or receiving block information sent by the upper computer; generating Cache data according to the received block information and storing the Cache data into the storage unit; and performing a calculation of DAG data according to the Cache data stored in the storage unit, and storing the calculated DAG data obtained into the storage unit;

and performing an operation on a proof of work according to the stored DAG data.

7. A computer program product, comprising computer programs, wherein when the computer programs are executed by a processor, the computer programs perform the method for operation on a proof of work of claim 6.

8. A non-transitory computer readable storage medium storing computer programs, which when executed by a processor, perform the method for operation on a proof of work of claim 6.

* * * * *